Dec. 8, 1925.
S. C. WOLFE
WINDSHIELD CLEARER
Original Filed June 6, 1917
1,564,304
Fig. 1.
Fig. 2.
Fig. 3.
Fig. 4.
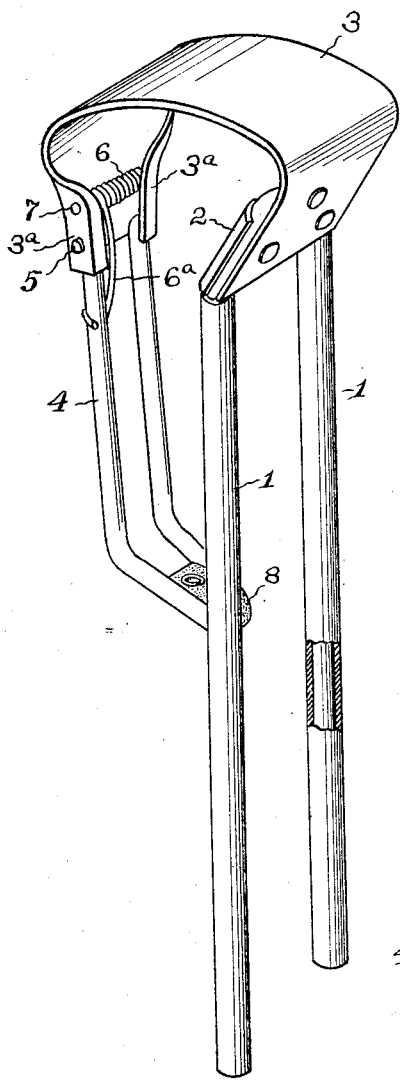
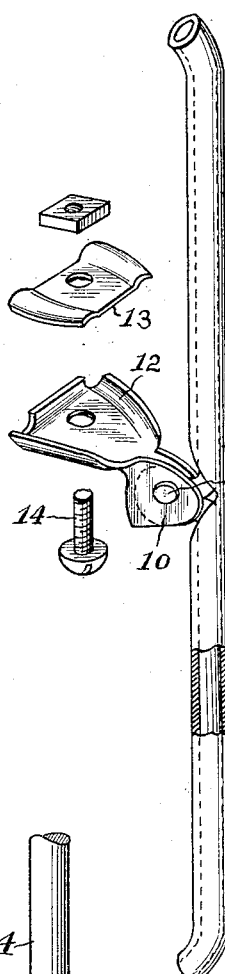
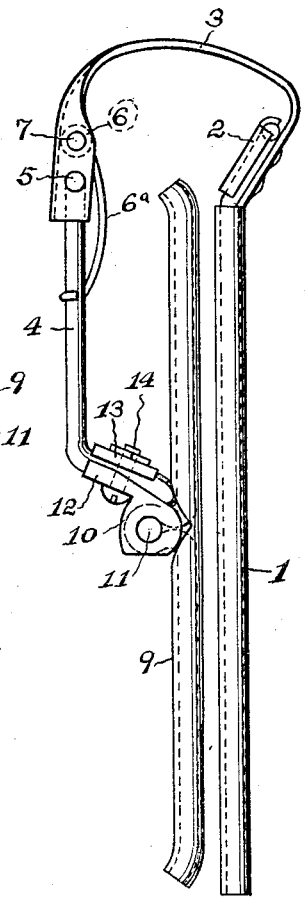
Inventor
S. C. Wolfe
By Robb, Robb & Hill
Attorneys Patented Dec. 8, 1925.

1,564,304

UNITED STATES PATENT OFFICE.

SAMUEL C. WOLFE, OF ANGOLA, INDIANA, ASSIGNOR TO FERNALD MANUFACTURING COMPANY, OF NORTH EAST, PENNSYLVANIA, A CORPORATION.

WINDSHIELD CLEARER.

Original application filed June 6, 1917, Serial No. 173,146. Divided and this application filed October 14, 1922. Serial No. 594,422.

*To all whom it may concern:*

Be it known that I, SAMUEL C. WOLFE, a citizen of the United States, residing at Angola, in the county of Steuben and State of Indiana, have invented certain new and useful Improvements in Windshield Clearers, of which the following is a specification.

This invention comprises an improved windshield clearing device of the type disclosed in my Letters Patent No. 1,171,377, granted February 8, 1916, and the particular improvement which is covered by this application is the auxiliary inside wiper which can be applied to the device so that the outside and the inside surfaces of the windshield will both be simultaneously cleared when the device is operated.

This application is a division of my copending application for a windshield clearer, filed June 6, 1917, Serial Number 173,146. The improvements in the arch construction are covered by the claims of the said copending application, while the auxiliary inside wiper is covered by the claims of this divisional application.

While in my prior patented device I employ wiper members only for the outer surface of the shield, in this device I may adhere to the same principle of construction and operation, except that I have made provision for equipping the clearing device with an auxiliary wiper adapted to operate on the inner surface of the windshield while the outer wiper members are operating upon its outer surface. If, therefore, the inner wiper is desired, by reason of the novel construction of this invention it may be supplied as a part of the specific equipment of my general clearing device, whereas if it is not so desired the clearing device may be supplied without an inner wiper as a part thereof.

The provisions for the foregoing construction and operation of the invention involve the employment of an inner wiper member which is detachably fitted to the handle of my main clearing device in such a manner that the handle may readily co-act in the customary way disclosed in my previous patent, with the inner surface of the windshield, as by a direct pressure bearing thereon when the inner wiper is not used. On the other hand, if the inner wiper is to be used its detachable connection with the handle is such that the anchorage bearing of the handle against the inner side of the windshield is established through the said inner wiper member directly contacting with the glass of the shield. As respects this feature of the invention, it is noticeable that the inner wiper member is mounted in a peculiar rocking manner upon the handle, and as a result said wiper member is adapted to readily accommodate itself to inequalities in the surface of the windshield, and likewise has movement which admits of great ease in positioning the inner and outer wiper members respectively to one another for facilitating the attachment of the clearing device to the windshield.

With the foregoing and other objects in view the construction and operation of my invention will be readily understood upon reference to the following detailed description and accompanying drawings, in which:

Figure 1 is a perspective view of a clearing device of a type which is adapted to have the auxiliary inside wiper detachably applied thereto.

Figure 2 is a view of the detachable inner wiper member and the attaching parts therefor.

Figure 3 is a side elevation of the clearing device with the inside wiper applied thereto.

Figure 4 is an enlarged sectional view through the portion of the handle to which the auxiliary wiper is applied, portions of the auxiliary wiper being also shown.

As seen in Figure 1, my device comprises parts equivalent to a large extent to the similar parts shown in the device of my previous patent, including primarily the outer main wiper members 1, disposed in spaced relation and made from a single length of wire bent into somewhat U-form. A clamping plate 2 is riveted to the outer portion of the spring arch 3 to attach the unit comprising the wiper members 1 to said arch. The wiper members 1 are supplied with the usual tubular casings or coverings preferably of rubber, the latter providing uninterrupted and resilient contact surfaces for effecting the wiping action of the device. The arch 3 is made preferably of flat spring metal and is therefore resilient, and said arch is quite broad in order that it will have a broad bearing against the edge of the shield with which it engages. The object of this broad bearing is to maintain the device in a substantially vertical position as it is moved to and fro across the surface of the shield in its clearing action.

To the inner end of the arch 3 is attached the handle 4 preferably made from a length of wire bent upon itself intermediate its ends to provide said portions formed with lateral extensions 5 passing through openings in flanges 3ª bent to provide channel-like elements at the inner end or side of the arch 3. Preferably the channel portions of the flanges 3ª are of greater area than the thickness of the spaced side portions of the handle 4 so that the handle is permitted to have a certain amount of play pivotally respecting the members 3ª. Normally, however, a coiled spring 6 encircling a pintle 7 on the flanges 3ª, and having connection at one end as seen at 6ª with the handle 4 tends to force the handle in the direction of the wiper members 1. The spring 6 is relied upon to exert sufficient resilient pressure upon the handle to create that degree of pressure of the extremity 8 of said handle, and the wiper members 1, acting upon the opposite sides of the wind shield, to anchor or hold the clearing device in a proper normal position on the shield against accidental displacement or movement.

With a view to obtaining its proper pressure bearing against the inner surfaces of the windshield, the lower portion of the handle is preferably deflected slightly at an angle toward the shield to provide a bearing member the end of which is equipped with a covering element 8 to prevent scratching of the shield.

According to the embodiment of the invention as above described, it will be evident that my clearing device may be disposed upon a windshield with the arch 3 uppermost and having its broad bearing at spaced points on the uppermost edge of the frame of the shield, the parts 1 and 4 depending from the arch. On the other hand, if desired, by proper adjustment of the windshield sections the members 1 and 4 may be disposed in an upward direction, the arch 3 received between the edges of the glass sections of the shield and an inverted arrangement of the clearing device obtained in which position it will be just as effective as when in the position first mentioned. The thinness of the arch 3 permits of this latter arrangement of the device to be obtained.

In the actual use of the device as just described it is to be understood that the relative movement of the parts 3 and 4 owing to the connection 5, facilitates the attachment of the device to the windshield without undue strain upon the parts and when abnormal pressure of the wiper members 1 on the outer surface of the shield is desired to effect thorough clearing of the surface it will be evident that by pulling inwardly on the handle 4 the upper outer portions of the handle will so abut with the arch 3 as to increase the resilient pressure of the arch acting upon the members 1, in an obvious manner.

The inner wiper member is designated 9 and consists of a length of wire pivoted to a bracket 10 by being looped about a pivot 11 mounted transversely on the bracket. The ends of the wiper member are equipped with the tubular rubber casings for the customary purposes. The bracket 10 is formed with an extension 12 bent to provide a seat to receive the lower angular portion of the handle 4 and a clamping plate 13 disposable above said angular portion of the handle is adapted to be screwed tightly down thereon by means of a bolt and nut connection 14, whereby the member 12 is firmly attached to the handle. The parts 12, 13 and 14 are so readily displaceable and attachable that the removal and attachment of the member 9 is a matter of great ease.

Sometimes the inner surface of a windshield becomes covered by moisture or other obstruction interfering with vision and under these conditions the element 9 is useful. As a matter of fact, the members 1 and 9 may be characterized as main and auxiliary wiper members for the purposes of this description and the action of the parts is clear in view of the foregoing statement of invention and presentation of the detailed construction.

Having thus described my invention what I claim as new and desire to secure by Letters Patent is:

1. An attachment for windshield clearers of the type having a wiper mounted for reciprocation over the outer surface of the windshield glass and an operating arm located adjacent the inner surface of the glass, said attachment comprising a bracket adapted to be detachably applied to the operating arm, and an auxiliary wiper carried by the bracket and movable relative thereto so that it can adjust itself for proper engagement with the inner surface of the windshield glass, both sides of the windshield glass being adapted to be cleared at the same time when the attachment is applied to the clearer.

2. An attachment for windshield clearers of the type having a wiper element mounted for reciprocation over the outer surface of the windshield glass and an operating arm located adjacent the inner surface of the glass, said attachment comprising a bracket plate, a clamping plate, a screw connecting the bracket plate and clamping plate and adapted to hold them in a rigid engagement with the operating arm, and an auxiliary wiper carried by the bracket plate and adapted to engage the inner surface of the windshield glass so that both sides of the glass can be cleared at the same time when the attachment is applied to the clearer.

3. An attachment for a windshield clearer of the type having a wiper mounted for reciprocation over the outer surface of the windshield glass and resilient means including an operating arm provided with a bearing member adapted to engage the inner surface of the glass, said attachment comprising a bracket adapted to be detachably applied to the operating arm, and an auxiliary wiper carried by the bracket and pivotally connected thereto, so that it can adjust itself for engagement with the inner surface of the windshield glass, the bearing member of the operating arm being lifted away from the glass when the attachment is applied thereto so that the resilient means of the clearer will be utilized to hold the auxiliary wiper in a yielding engagement with the windshield glass.

4. An attachment for a windshield clearer of the type having a wiper element mounted for reciprocation over the outer surface of the windshield glass and a frame for holding the same in operative position on the windshield, the windshield clearer being a complete entity and adapted to be used by itself to clear one side only of the glass, said attachment including an auxiliary wiper adapted to engage the inner surface of the glass, and means for detachably connecting the auxiliary wiper to the frame of the windshield clearer, whereby both sides of the glass can be cleared at the same time when the attachment is used.

In testimony whereof I affix my signature.

SAMUEL C. WOLFE.